United States Patent [19]
Osborne

[11] Patent Number: 5,681,369
[45] Date of Patent: Oct. 28, 1997

[54] APPARATUS AND METHOD FOR RECOVERING VOLATILE LIQUID

[75] Inventor: John B. Osborne, Allentown, Pa.

[73] Assignee: Jordan Holding Company, Fisherville, Ky.

[21] Appl. No.: 645,549

[22] Filed: May 10, 1996

[51] Int. Cl.⁶ ............................................. B01D 53/04
[52] U.S. Cl. ........................ 95/93; 95/97; 95/101; 95/102; 95/143; 95/204; 95/240; 96/122; 96/130; 96/131; 96/144
[58] Field of Search .......................... 95/92–95, 101, 95/102, 143–146, 149, 204, 239, 240; 96/108, 121, 122, 130–133, 143, 144

[56] References Cited

U.S. PATENT DOCUMENTS

| | | | |
|---|---|---|---|
| 1,496,061 | 6/1924 | Loomis | 95/92 X |
| 2,325,577 | 7/1943 | Balcar | 95/92 |
| 2,919,766 | 1/1960 | Dillman et al. | 95/93 |
| 3,266,262 | 8/1966 | Moragne | 62/54 |
| 3,320,756 | 5/1967 | Hashemi | 62/45 |
| 3,714,790 | 2/1973 | Battey | 62/48.2 |
| 3,771,317 | 11/1973 | Nichols | 62/54 |
| 3,830,040 | 8/1974 | Hendrix | 62/48.2 X |
| 3,830,074 | 8/1974 | Nichols | 62/48.2 |
| 3,867,111 | 2/1975 | Knowles | 95/21 |
| 3,972,201 | 8/1976 | Datis | 62/54 |
| 4,066,423 | 1/1978 | McGill et al. | 95/92 |
| 4,077,789 | 3/1978 | Edwards | 62/48.2 |
| 4,110,996 | 9/1978 | Thompson | 62/48.2 |
| 4,305,734 | 12/1981 | McGill | 95/102 |
| 4,331,456 | 5/1982 | Schwartz et al. | 95/93 |
| 4,343,629 | 8/1982 | Dinsmore et al. | 95/93 |
| 4,350,018 | 9/1982 | Frank et al. | 62/54 |
| 4,462,811 | 7/1984 | Dinsmore et al. | 95/26 |
| 4,480,393 | 11/1984 | Flink et al. | 34/27 |
| 4,536,197 | 8/1985 | Cook | 96/122 |
| 4,569,207 | 2/1986 | James | 62/235.1 |
| 4,670,028 | 6/1987 | Kennedy | 95/92 |
| 4,682,549 | 7/1987 | Hall | 110/345 |
| 4,715,868 | 12/1987 | Kennedy | 95/94 |
| 4,857,084 | 8/1989 | Robbins et al. | 95/97 |
| 4,995,890 | 2/1991 | Croudace | 96/122 X |
| 5,006,138 | 4/1991 | Hewitt | 62/18 |
| 5,017,240 | 5/1991 | Brown | 62/48.2 |
| 5,076,822 | 12/1991 | Hewitt | 62/48.2 X |
| 5,118,328 | 6/1992 | Wnuk et al. | 95/146 X |
| 5,125,935 | 6/1992 | Nakaya et al. | 95/98 |
| 5,154,735 | 10/1992 | Dinsmore et al. | 95/92 |
| 5,176,002 | 1/1993 | O'Brien et al. | 62/48.2 |

(List continued on next page.)

FOREIGN PATENT DOCUMENTS 04-007013  1/1992  Japan .......................... 95/95

OTHER PUBLICATIONS

Kappa Gi; Vapor Recovery Units DWG 920–15; Brochure (undated).

Dinsmore, Harold L.; "Excessive Carbon Bed Temperatures"; Service Bulletin 11; Jul. 6, 1993, (8 pages).

*Primary Examiner*—Robert Spitzer
*Attorney, Agent, or Firm*—King and Schickli

[57] ABSTRACT

An apparatus is provided for recovering volatile liquid vapor from an air-volatile liquid vapor mixture. The apparatus includes first and second reaction vessels. Each of these reaction vessel includes a bed of adsorbent having an affinity for the volatile liquid vapor. The apparatus also includes a pump and an absorber for regenerating either bed of adsorbent. Further, the apparatus includes a polisher including a polisher bed of adsorbent having an affinity for the volatile liquid vapor. This polisher bed adsorbs volatile liquid vapor and substantially clean air is exhausted when initially regenerating one of the two beds of adsorbent in the first and second reaction vessels. Still further, the apparatus also includes a cooperating valve and conduit system for interconnecting the other components. Further, the invention relates to a related process for recovering volatile liquid vapor and a method of reducing backpressure in a volatile liquid vapor recovery system or unit.

17 Claims, 2 Drawing Sheets

U.S. PATENT DOCUMENTS

| | | | |
|---|---|---|---|
| 5,187,131 | 2/1993 | Tiggelbeck et al. | 502/34 |
| 5,269,833 | 12/1993 | Nitsche | 95/93 |
| 5,294,246 | 3/1994 | Gardner, Sr. | 95/15 |
| 5,345,771 | 9/1994 | Dinsmore | 62/18 |
| 5,426,945 | 6/1995 | Menzenski | 62/11 |
| 5,512,087 | 4/1996 | Varner et al. | 96/130 X |
| 5,515,686 | 5/1996 | Jordan | 96/126 |
| 5,584,911 | 12/1996 | Menzenski | 95/94 |
| 5,591,254 | 1/1997 | Gibson | 96/122 X |

5,681,369

APPARATUS AND METHOD FOR RECOVERING VOLATILE LIQUID

Benefit of priority is hereby claimed on U.S. Provisional patent application Ser. No. 60/008,771, filed Nov. 16, 1995, entitled "Polisher Process".

TECHNICAL FIELD

The present invention relates generally to an apparatus and process for recovering volatile liquids from air-volatile liquid vapor mixtures and, more particularly, to an improved apparatus and process that effectively increases the efficiency and the capacity of the beds of adsorbent used to capture the volatile liquid that is expelled from vessels such as tank cars, trucks, ships and the like during loading.

BACKGROUND OF THE INVENTION

When handling volatile liquids such as hydrocarbons including gasoline and kerosene, air-volatile liquid vapor mixtures are readily produced. The venting of such air-volatile liquid vapor mixtures directly into the atmosphere would result in significant pollution of the environment and a fire or explosion hazard. Accordingly, existing environmental regulations require the control of such emissions.

As a consequence, a number of processes and apparatus have been developed and utilized to recover volatile liquids from air-volatile liquid vapor mixtures. Generally, the removed volatile liquids are liquified and recombined with the volatile liquid from which they were vaporized thereby making the recovery process more economical.

The initial vapor recovery systems utilized in the United States in the late 1920's and early 1930's incorporated a process combining compression and condensation. Such systems were originally only utilized on gasoline storage tanks. It wasn't until the 1950's that local air pollution regulations began to be adopted forcing the installation of vapor recovery systems at truck loading terminals. Shortly thereafter, the "clean air" legislation activity of the 1960's, which culminated in the Clean Air Act of 1968, further focused nationwide attention on the gasoline vapor recovery problem. As a result a lean oil/absorption system was developed. This system dominated the marketplace for a short time.

Subsequently, in the late 1960's and early 1970's cryogenic refrigeration systems began gaining market acceptance (note, for example, U.S. Pat. No. 3,266,262 to Moragne). While reliable, cryogenic systems suffer from a number of shortcomings including high horsepower requirements. Further, such systems require relatively rigorous and expensive maintenance to function properly. Mechanical refrigeration systems also have practical limits with respect to the amount of cold that may be delivered, accordingly, the efficiency and capacity of such systems is limited. In contrast, liquid nitrogen cooling systems provide more cooling than is required and are prohibitively expensive to operate for this type of application.

As a result of these shortcomings of cryogenic refrigeration systems, alternative technology was sought and adsorption/absorption vapor recovery systems were more recently developed. One such system is disclosed in, for example, U.S. Pat. No. 4,066,423 to McGill et al. Such systems utilize a bed of solid adsorbent selected, for example, from silica gel, certain forms of porous mineral such as alumina and magnesia, and most preferably activated charcoal. These adsorbents have an affinity for volatile hydrocarbon liquids. Thus, as the air-hydrocarbon vapor mixture is passed through the bed, a major portion of the hydrocarbons contained in the mixture are adsorbed on the bed. The resulting residue gas stream comprising substantially hydrocarbon-free air is well within regulated allowable emission levels and is exhausted into the environment.

It should be appreciated, however, that the adsorbent is only capable of adsorbing a certain amount of hydrocarbons before reaching capacity and becoming ineffective. Accordingly, the bed must be periodically regenerated to restore the carbon to a level where it will effectively adsorb hydrocarbons again. This regeneration of the adsorbent is a two step process.

The first step requires a reduction in the total pressure by pulling a vacuum on the bed that removes the largest amount of hydrocarbons. The second step is the addition of a purge air stream that passes through the bed. The purge air polishes the bed so as to remove substantially all of the previously adsorbed hydrocarbons. These hydrocarbons are then pumped to an absorber tower wherein lean oil or other nonvolatile liquid solvent is provided in a countercurrent flow relative to the hydrocarbon rich air-hydrocarbon mixture being pumped from the bed. The liquid solvent condenses and removes the vast majority of the hydrocarbons from that mixture and the residue gas stream from the absorber tower is recycled to a second bed of adsorbent while the first bed completes regeneration.

An inherent problem in recovering volatile liquid vapors displaced from terminal racks and the like is the low pressure at which they are generated. With the piping and fittings between the truck, ship, tank car or other vessel and the vapor recovery unit, there is typically no more than 12" w.c. gauge pressure (less than ½ psig) with which to work. If not assisted by a blower, this pressure must suffice to force the vapors through the inlet valve, the sparger, the adsorbent bed, the vent valve and the vent stack. Complicating this problem is the additional backpressure produced by the recycle stream from the absorber. Depending upon the size of the vacuum pump being used, this recycle stream may be as much as double the flow entering a bed during the first two minutes of a typical fifteen minute regeneration cycle. As a result, in many applications the adsorbent bed height is limited because of its significant impact on pressure drop. This restriction can lead to a "wide and short" bed geometry implicated in temperature excursions and ineffective volatile liquid vapor removal.

At present, no truly effective and efficient approach has been developed to address this problem. A need is therefore identified for an appropriate improvement to state of the art vapor recovery systems and methods.

SUMMARY OF THE INVENTION

Accordingly, it is a primary object of the present invention to provide a process and apparatus for the recovery of volatile liquid from an air-volatile liquid mixture overcoming the above described limitations and disadvantages of the prior art.

An additional object of this invention is to provide an apparatus and method for retrofitting to state of the art vapor recovery units that effectively increases the efficiency and instantaneous through-put capacity of those units by as much as 100% in a very cost effective and simple manner.

Yet another object of the present invention is to provide a new process and new apparatus for the recovery of volatile liquids from an air-volatile liquid vapor mixture wherein a significant decrease in system backpressure is achieved resulting in increases in through-put capacity while maintaining full vapor removal efficiency. Accordingly, smaller reaction vessels and adsorption beds are able to process larger volumes of air-volatile liquid vapor.

Still another object of the present invention is to provide an improved apparatus and method for the recovery of volatile liquid vapors that effectively reduces system backpressure by either eliminating a volume of air-volatile liquid vapor mixture from the absorber overhead or reaction vessel undergoing regeneration at least during the initial stages of regeneration. Accordingly, more volatile liquid vapor may be recovered from the source thereof (e.g. a terminal rack) at lower pressures.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved apparatus and process are provided for recovering volatile liquid vapors from an air-volatile liquid vapor mixture such as expelled from a vessel adapted for holding a volatile liquid during breathing, loading or refilling of that vessel. Specifically, the apparatus includes first and second reaction vessels each having a bed of adsorbent exhibiting an affinity for the volatile liquid vapor. In this way the volatile liquid vapor is adsorbed on the bed and relatively volatile liquid vapor free air is produced. Additionally, the apparatus includes a pump and an absorber that may be utilized in a manner known in the art to regenerate the bed of adsorbent once it reaches its capacity.

Still further, the apparatus includes a polisher having a polisher bed of adsorbent again exhibiting an affinity for the volatile liquid vapor. In this way, it is possible to adsorb volatile liquid vapor on the polisher bed and produce relatively volatile liquid vapor free air when initially regenerating one of the beds of adsorbent in the first and second reaction vessels. Of course, a cooperating valve and conduit system function to interconnect the first and second reaction vessels, the pump, the absorber and the polisher.

In accordance with an important aspect of the present invention, the polisher may be connected into the cooperating valve and conduit system between the pump and absorber or alternatively, between the absorber and the first and second reaction vessels. When connected between the pump and absorber, the polisher is utilized to treat the air-volatile liquid vapor mixture initially drawn from the first or second reaction vessel undergoing regeneration. As a result of that treatment, clean air is exhausted into the environment and volatile liquid vapor is adsorbed by the polisher bed. It must be appreciated that a substantial portion of the air volume of the air-volatile liquid vapor mixture treated in the polisher is not returned or recycled to either of the first or second reaction vessels. Accordingly, backpressure in the feed line leading to those reaction vessels is reduced thereby increasing the operating efficiency thereof including instantaneous through-put capacity.

Similarly, when the polisher is positioned between the absorber and the first and second reaction vessels, the air-volatile liquid vapor mixture from the overhead of the absorber is treated passed through the polisher bed so that volatile liquid vapor is adsorbed or captured and clean air is exhausted into the environment.

In accordance with yet another important aspect of the present invention, a supplemental regeneration valve and conduit system may be provided for selectively drawing off air from the first or second reaction vessel above the actual level of the bed therein. In this way, the initial air from the reaction vessel undergoing regeneration is drawn by the pump without passing through the bed of adsorbent. Accordingly, the air-volatile liquid mixture includes a relatively low concentration of volatile liquid vapor. Consequently, the overall volume of the adsorbent in the polisher bed may be reduced.

More particularly, the apparatus may be described as including first and second reaction vessels each including a bed of adsorbent with an affinity for volatile liquid and a first cooperating feed valve and conduit system for selectively feeding the air-volatile liquid vapor mixture from a source thereof to either of the first or second reaction vessels. Additionally, the apparatus may be described as including a pump, an absorber and a second cooperating feed valve and conduit system for selectively connecting the pump to either of the first or second reaction vessels thereby allowing a vacuum to be drawn on the bed in the connected reaction vessel leading to the recovery of the previously adsorbed volatile liquid vapor now concentrated in air.

Still further, the apparatus includes an absorber conduit system for feeding volatile liquid vapor concentrated in air from the pump to the absorber. A polisher including a polisher bed of adsorbent having an affinity for the volatile liquid vapor may also be provided. A cooperating polisher valve and conduit system provides for (1) selectively feeding the air-volatile liquid vapor mixture from the absorber to either the first cooperating valve and conduit system or the polisher and (2) selectively connecting the polisher into fluid communication with the pump for regeneration of the polisher bed therein.

As further defined, the apparatus may also include a separator in fluid communication between the pump and absorber for separating the air-volatile liquid vapor mixture from a sealing fluid for the pump. Further, the apparatus may include a supplemental regeneration valve and conduit system for selectively drawing off air with the pump from the first and second reaction vessels at a level above the beds.

In the alternative embodiment the apparatus may be defined as including the first and second reaction vessels previously described, a first cooperating feed valve and conduit system for selectively feeding the air-volatile liquid mixture from a source thereof to either of the first or second reaction vessels. Further, the apparatus may include a pump and absorber for regenerating the bed of adsorbent in the reaction vessels. A second cooperating feed valve and conduit system selectively connects the pump to either of the first or second reaction vessel to provide for regeneration of the bed contained therein. The apparatus also includes a polisher including a polisher bed of adsorbent and a polisher valve and conduit system for selectively feeding the air-volatile liquid vapor mixture from the pump to either of the polisher or absorber. An absorber conduit system feeds the volatile liquid vapor and air mixtures from the absorber to the first cooperating feed valve and conduit system.

In accordance with still another important aspect of the present invention, a process is provided for recovering volatile liquid vapor from an air-volatile liquid vapor mixture. The process includes the step of feeding the air-volatile liquid vapor mixture from a source thereof through a first bed of adsorbent having an affinity for the volatile liquid vapor. Accordingly, the volatile liquid vapor is adsorbed on the first bed and a substantially volatile liquid vapor-free air stream is exhausted. Next is the desorbing and recovering of the volatile liquid vapor from the first bed by pulling a vacuum on the first bed to draw the volatile liquid vapor previously adsorbed from the first bed. This is accomplished by pumping the air-volatile liquid vapor mixture through an absorber which removes the volatile liquid vapor from the air-volatile liquid vapor mixture drawn from the first bed.

Next, the process includes initially directing the air-volatile liquid vapor mixture exhausted from the absorber through a polisher. As described above, the polisher includes a polisher bed of adsorbent having an affinity for the volatile liquid vapor. As a result, volatile liquid vapor is adsorbed and substantially volatile liquid vapor-free air is exhausted. The method then further includes directing the air-volatile liquid vapor mixture from the absorber through a second bed of adsorbent having an affinity for the volatile liquid vapor whereby the volatile liquid is adsorbed on the second bed and a substantially volatile liquid vapor-free air stream is exhausted. This is done while simultaneously desorbing and recovering volatile liquid from the first and polisher beds.

An alternative embodiment of the process includes the step of feeding the air-volatile liquid vapor mixture through a first bed of adsorbent so as to adsorb the volatile liquid vapor and exhaust a substantially volatile liquid vapor free-air stream. This is followed by the step of desorbing and recovering the volatile liquid vapor from the first bed by pulling a vacuum on the first bed to draw the volatile liquid vapor previously adsorbed from the first bed. Next is the pumping of the air-volatile liquid vapor mixture through a polisher including a polisher bed of adsorbent that adsorbs the volatile liquid vapor and produces a substantially volatile liquid vapor free air stream. Subsequently, the air-volatile liquid vapor mixture from the first bed is directed through an absorber and a second bed of adsorbent whereby the volatile liquid vapor is adsorbed and substantially volatile liquid vapor free air is exhausted. This is done while simultaneously desorbing and recovering volatile liquid vapor from the first and polisher beds.

In accordance with still additional aspects of the present invention a method is provided for reducing backpressure in a vapor recovery system. This method is based upon the steps of providing a polisher in fluid communication with a regeneration circuit of the system and reducing the amount of air and volatile liquid vapor recycled directly to the two or more beds of the system. This is accomplished by circulating a volume of the air-volatile liquid vapor mixture from one of the two reaction vessels to the polisher during regeneration of the adsorbent in the reaction vessel undergoing regeneration. As a consequence volatile liquid vapor is adsorbed in the polisher and clean air is exhausted without recycling.

Additionally, a method is provided for increasing the through-put capacity of an existing vapor recovery system. This method is based upon the steps of providing a polisher for capturing volatile liquid vapor and exhausting clean air as well as connecting the polisher in fluid communication with the regeneration circuit. This allows clean air to be exhausted without returning to the vapor recovery circuit of the system thereby reducing backpressure therein.

Further, a method is provided for reducing volatile liquid vapor load in a recycled air-volatile liquid vapor mixture during regeneration of adsorbent in a first reaction vessel of a vapor recovery system. This method includes the step of locating an air space in the first reaction vessel adjacent the adsorbent. Next is the providing of a regeneration circuit in direct communication with this air space. This is then followed by drawing a volume of air-volatile liquid vapor mixture from the air space while minimizing drawing of any volatile liquid vapor from the adsorbent. In this way it is possible to substantially minimize the volatile liquid vapor load in that volume of air-volatile liquid vapor mixture drawn during regeneration.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiments of the invention, and examples of which are illustrated in the accompanying drawing.

DETAILED DESCRIPTION OF THE INVENTION

Figure 1:
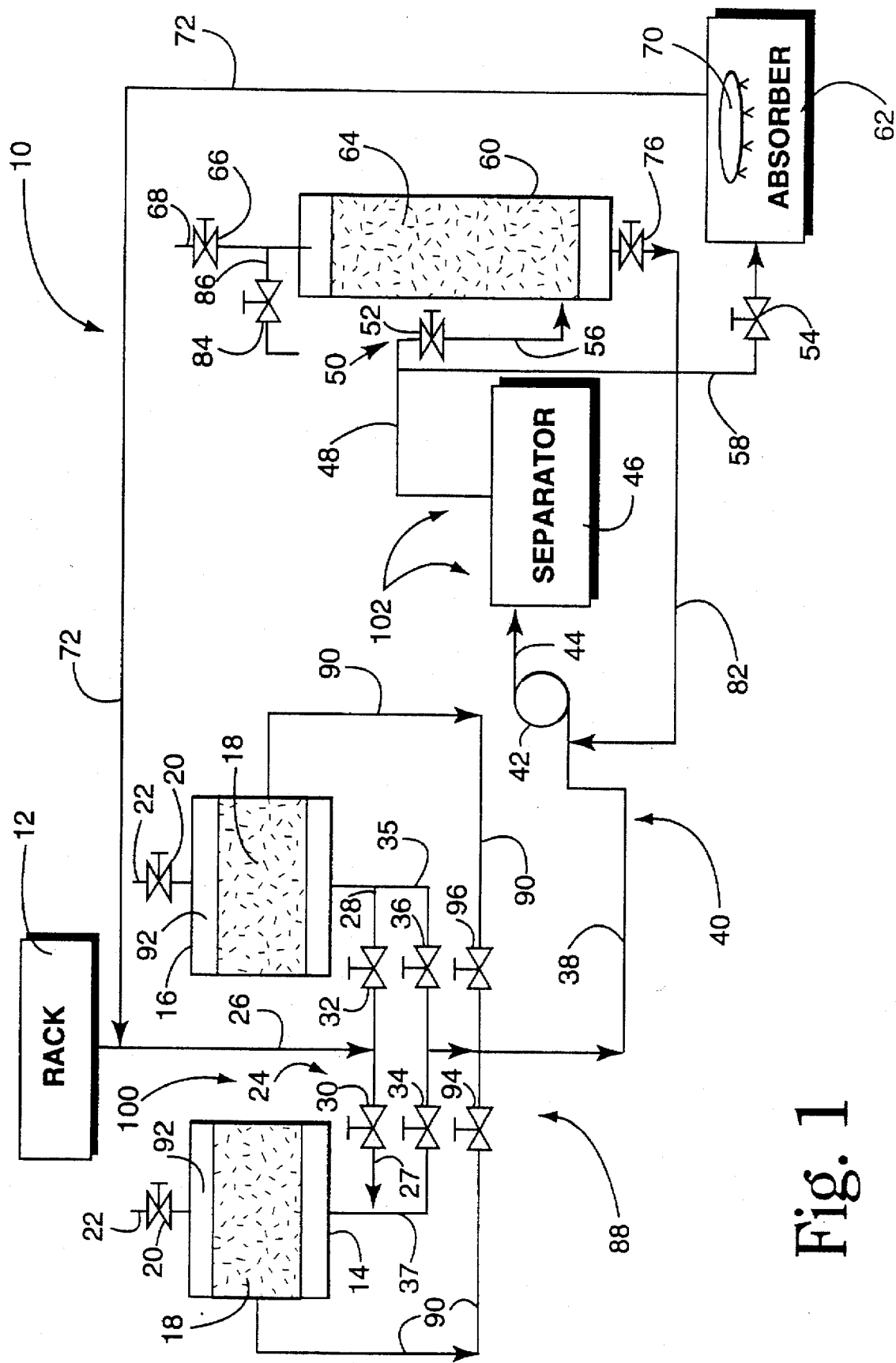
FIG. 1 is a schematical block diagram showing a first embodiment of the present invention.
Figure 2:
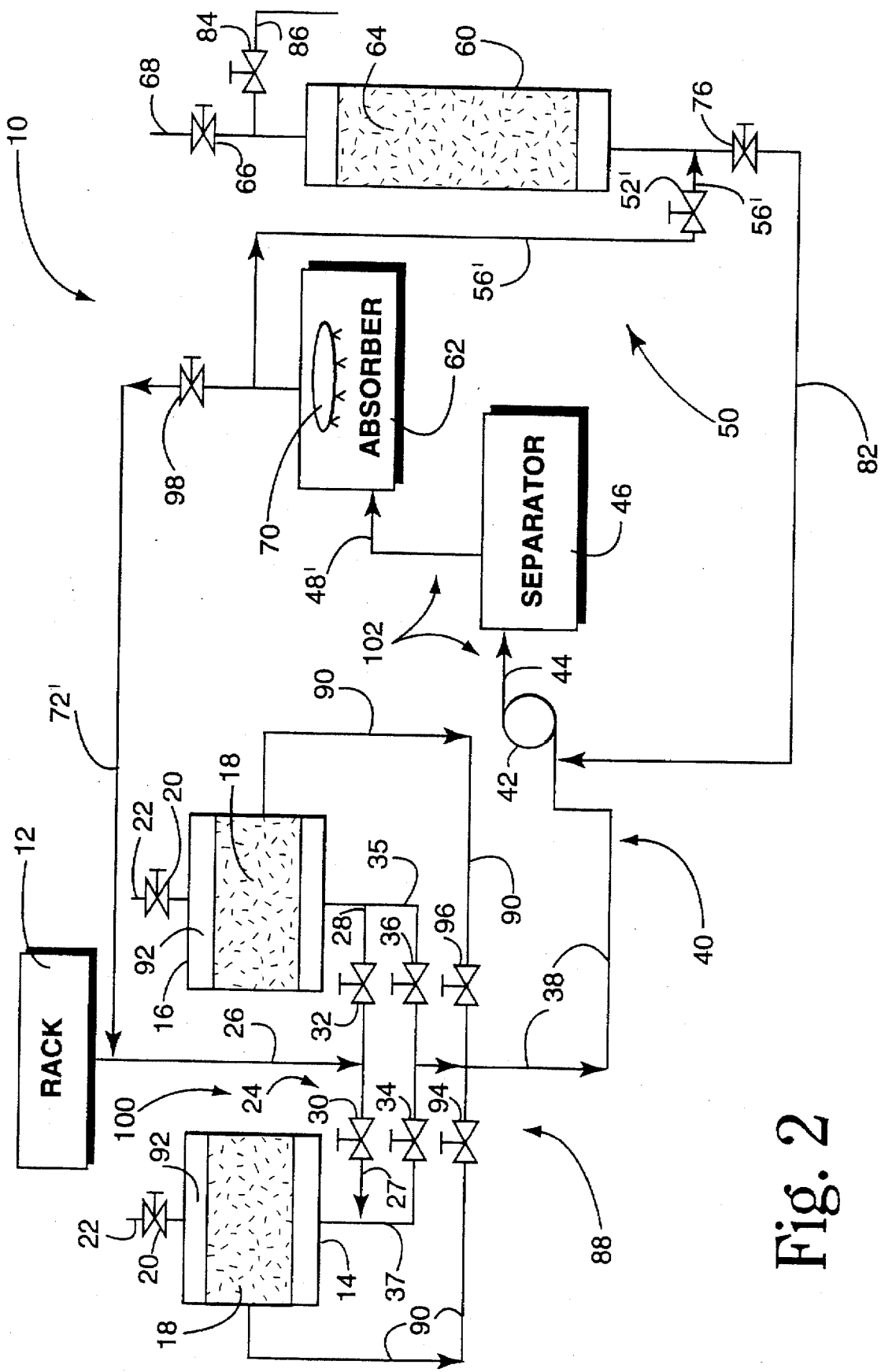
FIG. 2 is another schematical block diagram showing a second embodiment of the present invention.

Reference is now made to FIGS. 1 and 2 showing two embodiments of the apparatus 10 of the present invention for recovering volatile liquid vapor from an air-volatile liquid vapor mixture such as expelled from a holding vessel (not shown) during breathing, loading or refilling of that vessel. In the two drawing figures, the source 12 of the volatile liquid vapor is illustrated as a terminal rack. It should be appreciated, however, that the present invention is not limited to this particular application.

Turning now specifically to the first embodiment shown in FIG. 1, the apparatus 10 includes first and second reaction vessels 14, 16. As is known in the art, each reaction vessel 14, 16 includes a bed 18 of adsorbent having an affinity for the volatile liquid vapor. Such adsorbents are well known in the art and may, for example, include silica gel, certain forms of porous minerals such as alumina or magnesia and, more preferably, activated charcoal. As the air-volatile liquid vapor mixture passes through the bed 18 in either of the reaction vessels 14, 16, volatile liquids (e.g. hydrocarbons) are adsorbed and substantially hydrocarbon-free air is exhausted into the environment past the associated valve 20 through exhaust line 22.

More specifically, the air-volatile liquid vapor mixture collected at the rack 12 is selectively fed through a first cooperating feed valve and conduit system 24 to one of the two reaction vessels 14, 16. As shown, the first cooperating valve and conduit system 24 includes the feed lines 26–28 and the control valves 30, 32 of a type well known in the art. Thus, it should be appreciated that when it is desired to feed the air-volatile liquid vapor mixture from the rack or source 12 to the reaction vessel 14, valve 30 is opened and valve 32 is closed. In contrast, when it is desired to feed the air-volatile liquid vapor mixture from the rack or source 12 to the reaction vessel 16, valve 30 is closed and valve 32 is opened.

Of course, the bed 18 in each reaction vessel 14, 16 is only capable of adsorbing a certain amount of volatile liquid vapor (e.g. hydrocarbons) before it reaches its capacity and becomes ineffective. Accordingly, each bed 18 must be periodically regenerated by means of releasing the previously adsorbed hydrocarbons. This is done by terminating the flow of air-volatile liquid vapor mixture through the reaction vessel 14, 16 including the bed 18 in question. This is completed by closing the appropriate valve 30, 32. Regeneration of the bed 18 is then accomplished by also closing the exhaust valve 20 of the relevant reaction vessel 14, 16 followed by the opening of the appropriate control valve 34, 36 leading to regeneration line 38.

As should be appreciated, both of the valves 34, 36 (e.g. ball/butterfly valves) and the regeneration line 38 are part of a second cooperating feed valve and conduit system 40 leading to the vacuum pump 42. More specifically, for purposes of regeneration, the pump 42 is operated to draw a vacuum on the bed 18 in the reaction vessel 14, 16 undergoing regeneration. Any pump known in the art to be appropriate for this purpose may be utilized. Generally, a liquid ring 2-stage vacuum pump having a capacity of 100–2000 cfm is utilized for this purpose. Of course, multiple pumps may also be used if desired.

As the pump 42 draws the vacuum down in the reaction vessel 14, 16 being regenerated to approximately 22–28 and more preferably 25–27 inches of mercury (Hg) vacuum, hydrocarbons are released from the bed 18 and drawn through lines 35 or 37 past the appropriate valve 34, 36 through the regeneration line 38 to the pump 42. From there the air-volatile liquid mixture is delivered through feedline 44 to a separator 46 also of a type well known in the art. The separator 46 functions to separate the pump sealing fluid (which is recirculated to the pump 42) from the air-volatile liquid vapor mixture. This air-volatile liquid vapor mixture is then exhausted from the separator into the feedline 48 which forms a portion of the polisher valve and conduit system 50. The polisher valve and conduit system 50 also includes control valves 52 and 54 (e.g. ball/butterfly valve with RCS actuator or equivalent) for selectively feeding the air-volatile liquid vapor mixture from the separator 46 along respective feedlines 56, 58 to a polisher 60 or an absorber 62.

The polisher 60 includes a bed of polisher adsorbent 64 the same or different from material used in the beds 18. As will be described in greater detail below, the polisher 60 functions to adsorb or capture volatile liquid vapor while exhausting clean air past valve 66 through the exhaust line 68 into the environment.

In contrast, the absorber 62 functions to recover volatile liquid vapor from the air-volatile liquid vapor mixture by means of a countercurrent flow of solvents such as lean oil. This lean oil may be sprayed through a dispersal sprayer 70 connected to a source (e.g. storage tank) of lean oil by means of a feed line and pump (all well known in the art and not shown). Specifically, the lean oil from the dispersal sprayer 70 condenses the volatile liquid vapor from the air-volatile liquid vapor mixture delivered by the pump 42. The condensed hydrocarbons and lean oil are then collected from the bottom of the absorber 62 and delivered via a conduit (not shown) to the storage tank source. As should be appreciated, the residue air-volatile liquid vapor mixture from the absorber 62 is returned or recycled into the feedline 26 through the recycle line 72.

A complete operating cycle of the embodiment of the present apparatus 10 shown in FIG. 1 will now be described in detail. Initially, air-volatile liquid vapor mixture collected at the rack 12 is delivered through the feedline 26 past the control valve 30 along line 27 to the reaction vessel 14. The head pressure at the rack 12 is typically no more than 12 inches w.c. gauge pressure (less than ½ psig). That is sufficient to pass the air-volatile liquid vapor mixture through the bed 18 in the reaction vessel 14 where the volatile liquid vapor is adsorbed and to exhaust clean air past the valve 20 through the exhaust line 22.

As the bed 18 in the reaction vessel 14 nears adsorbence capacity, valve 30 and valve 20 are closed and valve 34 is opened to initiate regeneration. More specifically, the opening of valve 34 functions to connect the reaction vessel 14 through the regeneration lines 37, 38 to the vacuum pump 42. As the vacuum is drawn down, the volatile liquid vapor previously adsorbed in the bed 18 is released and drawn along the lines 37, 38 to the vacuum pump 42. The vacuum pump 42 then forces the air-volatile liquid vapor mixture through the feedline 44 into the separator 46. There the pump sealing fluid and air-volatile liquid vapor mixture are separated with the pump sealing fluid being recirculated to the vacuum pump and the air-volatile liquid vapor mixture being delivered into the feedline 48.

When initially regenerating the bed 18, valves 52 and 66 (e.g. ball/butterfly valves with RCS actuator or equivalent) are opened while valves 54 and 76 (also ball/butterfly valves with RCS actuator or equivalent) are closed. As a result, the air-volatile liquid vapor mixture in the feedline 48 is delivered past the valve 52 through the feedline 56 to the polisher 60. The hydrocarbon portion of the air-volatile liquid vapor mixture is then adsorbed in the polisher bed 64 with clean air exiting past the valve 66 through the exhaust line 68.

After approximately two minutes, valve 54 is opened and valves 52 and 66 are closed. As a result of this action, the air-volatile liquid vapor mixture in the feedline 48 is now delivered past the valve 54 through the feedline 58 to the absorber 62. Thus, the air-volatile liquid vapor mixture from the vacuum pump discharge, now highly concentrated with hydrocarbons, flows into the absorber 62 where the volatile liquid vapor condenses in the countercurrent lean oil flow from the dispersal sprayer 70. The volatile liquid vapor and lean oil are collected and recovered from the bottom of the absorber 62.

The residue air-volatile liquid vapor mixture then exhausted from the absorber 62 along the recycle line 72 is delivered into the feedline 26. From there, it is directed past the open valve 32 through feedline 28 to the second reaction vessel 16. The bed 18 in the second reaction vessel 16 collects the remaining volatile liquid vapor in the air-volatile liquid vapor residue mixture while simultaneously collecting volatile liquid vapor from the air-volatile liquid vapor mixture being delivered from the terminal rack 12.

At approximately 8 minutes into the regeneration cycle, valve 76 is opened. This action allows regeneration of the polisher bed 64. More specifically, air-volatile liquid vapor mixture from the polisher 60 is drawn into the vacuum pump 42 by way of the polisher regeneration line 82 past the valve 76. The volatile liquid vapor in this air-volatile liquid vapor mixture then passes through the feedline 44, separator 46, feedline 48 and feedline 58 to the absorber 62. Any residual air-volatile liquid vapor mixture from the absorber 62 then travels through the recycle line 72 to the feedline 26 for delivery to the bed 18 of the second reaction vessel 16. There any residual volatile liquid vapor is adsorbed and clean air is exhausted through the exhaust line 22 as previously described.

Regeneration of the polisher bed 64 may be completed by then opening the valve 84 at approximately 12 minutes into the regeneration cycle so as to allow purge air to sweep into the polisher 60 through the purge air line 86. At approximately 13½ minutes into the regeneration cycle, valve 76 is closed and valve 66 is cracked (while valve 84 remains open) in order to allow the polisher 60 to begin repressurization. Repressurization is completed at approximately 14½ minutes into the regeneration cycle. Then valve 66 is fully opened and valve 84 is fully closed.

Once the bed 18 in the second reaction vessel 16 approaches its adsorbence capacity, a similar regeneration cycle is initiated for reaction vessel 16. Specifically, valves 32 and 20 communicating with the reaction vessel 16 are closed and valve 36 is opened. As a result, air-volatile liquid vapor mixture is drawn through the feedlines 35 and 38 past the valve 36 into the vacuum pump 42. From there the air-volatile liquid vapor mixture is forced through 15 the separator 46 into the feedline 48. Again, at the initiation of a regeneration cycle (e.g. for approximately the first two minutes), valve 54 is closed while valves 52 and 66 are opened. Accordingly, the initial air-volatile liquid vapor mixture discharged from the reaction vessel 16 is processed through the polisher bed 64 with volatile liquid vapor being adsorbed therein and clean air being discharged through the exhaust line 68.

At the appropriate time in the regeneration cycle (approximately 2 minutes into the cycle), valves 52 and 66 are closed in the manner previously described and valve 54 is opened. This action results in the air-volatile liquid vapor mixture now coming from the reaction vessel 16 being processed by the absorber 62. The residue air-volatile liquid vapor mixture from the absorber 62 is then recycled into the feedline 26 for delivery to the bed 18 in reaction vessel 14. There any remaining volatile liquid vapor is adsorbed and clean air is exhausted through the exhaust line 22. The remainder of the regeneration cycle continues just as previously described in detail with respect to the regeneration of bed 18 in reaction vessel 14 with operation of the appropriate valves at the previously indicated times. Accordingly, it should be appreciated that while reaction vessel 14 or 16 is being regenerated, the other reaction vessel is "on-line", being used to adsorb volatile liquid vapor from the air-volatile liquid vapor mixture being delivered from the rack 12 and the recycle line 72.

In accordance with another important aspect of the present invention, the apparatus 10 shown in FIG. 1 may also include a supplemental regeneration valve and conduit system, generally designated by reference numeral 88. More specifically, a feedline 90 is provided in fluid communication with an air space 92 provided in the top of each reaction vessel 14, 16. Control valves 94, 96 in the feedlines 90 may be opened to selectively connect the feedlines 90 with the regeneration line 38. Accordingly, when valve 94 is opened and valve 96 is closed, the vacuum pump 42 draws air-volatile liquid vapor mixture from the air space 92 incorporated into the reaction vessel 14 through the feedline 90 and regeneration line 38. In contrast, when valve 94 is closed and valve 96 is opened, the pump 42 draws air-volatile liquid vapor mixture from the air space 92 in the reaction vessel 16 through the feedline 90 and regeneration line 38.

Advantageously, this arrangement may be used to allow the initial volume of air-volatile liquid vapor mixture being drawn from the reaction vessel 14, 16 during regeneration to come from the air space 92 where the concentration of volatile liquid vapor is the lowest. Accordingly, the volatile liquid vapor load being delivered to the polisher 60 during the initial stages of regeneration is small. Consequently, the polisher bed 64 may also be made small yet still provide sufficient capacity to handle the volatile liquid vapor load. This better insures peak operation of the polisher 60 and complete regeneration of the polisher bed 64 during its relatively short regeneration cycle. Further, it allows the polisher 60 to be constructed in a lower capacity thereby requiring less adsorbent material. Accordingly, a significant cost saving results.

Turning now to the alternative embodiment shown in FIG. 2 the same reference numbers are utilized to describe many of the various components of the invention. The difference in the apparatus 10 relates to the positioning of the polisher 60. More specifically, while the polisher 60 is positioned between the vacuum pump 42 and absorber 62 in the FIG. 1 embodiment, in the FIG. 2 embodiment, the absorber is positioned between the vacuum pump and polisher.

Accordingly, in the embodiment in FIG. 2, the air-volatile liquid vapor mixture discharged from the separator 46 along feedline 48' is always fed directly into the absorber 62. It is the residue air-volatile liquid vapor mixture from the absorber 62 which is low in volatile liquid vapor load, that is alternately returned to the feedline 26 through the recycle valve 98 and recycle line 72' or directed to the polisher 60 through the polisher valve 52' along the polisher feedline 56'.

Briefly summarizing the operation of this embodiment, the bed 18 in the reaction vessel 14 may be regenerated by closing valves 20 and 30 in communication with reaction vessel 14 and opening regeneration valve 34. This allows the pump 42 to draw the air-volatile liquid vapor mixture from the reaction vessel 14 and bed 18 through the feedlines 37 and 38 past the valve 34. The pump 42 then discharges into the feedline 44 leading to the separator 46. After separation from the sealing fluid, the air-volatile liquid vapor mixture is then forced through the feedline 48' into the absorber 62. There the majority of the volatile liquid vapor from the air-volatile liquid vapor mixture is condensed and collected.

During the initial stages of regeneration (e.g. approximately the first two minutes), valve 98 is closed and valve 52' is opened. Accordingly, the residue air-volatile liquid vapor mixture from the absorber 62 is directed along the polisher feedline 56' to the polisher 60. Any remaining volatile liquid vapor mixture in the air-volatile liquid vapor mixture is then adsorbed in the polisher bed 64 and clean air is exhausted past valve 66 through the exhaust line 68.

After approximately 2 minutes, valves 52' and 66' are closed and valve 98 is opened. As a result of this action the remaining residue air-volatile liquid vapor mixture from the absorber 62 is directed through the recycle line 72' into the feedline 26 where it is delivered with air-volatile liquid vapor mixture from the rack 12 to the bed 18 of the second reaction vessel 16. Any remaining volatile liquid vapor is adsorbed by that bed 18 and clean air is exhausted through the exhaust line 22 past the valve 20.

At approximately 8 minutes into the regeneration cycle, valve 76 is opened to begin regeneration of the polisher bed 64. More specifically, with valve 76 open the air-volatile liquid vapor mixture is drawn from the polisher 60 along the regeneration line 82 into the pump 42. From there, the air-volatile liquid vapor mixture is delivered through the feedline 44 to the separator 46 and through the feedline 48' to the absorber 62. As already described, any residual air-volatile liquid vapor mixture at this time is fed from the absorber through the recycle line 72' to the feedline 26 for delivery to the reaction vessel 16.

At approximately 12 minutes into the regeneration cycle, valve 84 is opened to allow some purge air to sweep through the polisher 60. Then, at approximately 13½ minutes into the regeneration cycle, valve 76 is closed. Further, valve 84 remains open as valve 66 is cracked to repressurize the polisher 60. Repressurization is completed at approximately 14½ minutes into the approximately fifteen minute regeneration cycle so that the polisher 60 is again ready to go "on-line" when the next regeneration cycle is initiated to regenerate the bed 18 in reaction vessel 16. As already noted, the reaction vessels 14, 16 are alternately on-line for the absorption of volatile liquid vapor and off-line for regeneration to restore adsorption capacity to the beds contained therein.

As also shown in FIG. 2, the second embodiment may also be equipped with the supplemental regeneration valve and conduit system 88 including the feedlines 90 and control valves 94 and 96 already described. These control valves are preferably opened before the control valves 34, 36 in order to reduce the concentration of volatile liquid vapor in the initial mixture drawn from the reaction vessel 14, 16 being regenerated. Of course, it should be appreciated that the valves 94, 96 of the supplemental regeneration valve and conduit system 88 could also be operated simultaneously with the valves 34, 36 respectively. Still further, the supplemental valve and conduit system may fully replace the regeneration lines 35, 37 and the valves 34, 36.

As should be appreciated from the above comments, there is only limited head pressure available (typically no more than 12 inches w.c. gauge pressure, less than ½ psig), to force the air-volatile liquid vapor mixture from the terminal rack 12 through the feedlines 26, 27, 28, the reaction vessels 14, 16 including the beds 18 and the control valves 20 and the exhaust lines 22. Accordingly, the vapor recovery circuit, generally designated by reference numeral 100, must be carefully designed in order to avoid the complication of adding a bladder tank, blower or other device to force the air-volatile liquid vapor mixture through the system.

Complicating this problem is the additional backpressure produced by the delivery of the recycle stream of air-volatile liquid vapor mixture through the recycle line 72, 72' into the feedline 26. Depending upon the size of the vacuum pump 42, this recycle stream may as much as double the flow entering the beds 14, 16 during the first two minutes of a typical 15 minute regeneration cycle. In order to accommodate this added flow, the reaction vessels 14, 16 must often be designed of limited height in order to minimize the backpressure. This restriction often leads to a "wide and short" bed geometry often characterized by poor flow distribution which can lead to undesired temperature excursions and ineffective volatile liquid vapor removal.

In sharp contrast to state of the art vapor recovery systems, the present invention incorporates a polisher in the regeneration circuit generally designated by reference numeral 102. In either of the embodiments described and shown in FIGS. 1 and 2, the polisher 60 is operated during the initial 2 minutes of the regeneration cycle when the highest volume of air-volatile liquid vapor mixture is removed from the reaction vessel 14, 16 undergoing regeneration. When the air-volatile liquid vapor mixture is directed to the polisher 60, the volatile liquid vapor is adsorbed and clean air is exhausted into the environment rather than recycled into the feedline 26. This serves to significantly reduce backpressure in the feedline 26. It is only after the initial two minutes of the regeneration cycle is completed that the air-volatile liquid vapor mixture from the reaction vessel 14, 16 undergoing regeneration is recycled through the recycle line 72, 72' into the feedline 26. Since the vacuum pump 42 has already removed the majority of the air in the air-volatile liquid vapor mixture from the reaction vessel, the present apparatus, in the form of either embodiment, clearly functions to significantly limit and control backpressure resulting from the recycle stream.

This reduction in backpressure results in a number of very beneficial advantages. More specifically, as a direct result of the reduced backpressure, the reaction vessels 14, 16 may be made of a taller height and still allow proper flow. The increase in height and resulting reduction in diameter substantially improves the vapor flow distribution through the bed. Further, a higher flow velocity is maintained so that the risk of carbon bed temperature excursions is reduced. Obviously, instantaneous through-put capability is also increased since the volume of the recycle stream is reduced and the volume of new air-volatile liquid vapor mixture generated at the rack that is able to be handled by the apparatus during the initial stages of the regeneration cycle is increased. This, of course, is a very significant advantage that represents a very important advance in the art.

Of course, when a new apparatus 10 is designed to include the polisher 60, significant advantages also result. More specifically, since the polisher essentially functions to increase the instantaneous through-put capacity of each reaction vessel by up to 100%, smaller reaction vessels may be utilized to accommodate anticipated peak capacity needs. As indicated earlier, these beds may also be made higher or taller and with a reduced diameter to increase the velocity of the flow through. These changes result in significant cost savings in both reaction vessel construction costs and the amount of adsorbent needed to fill the reaction vessels.

In summary, numerous benefits result from employing the concepts of the present invention. Perhaps most significantly, the present method and apparatus provide the ability to process a greater volume of air-volatile liquid vapor mixture at lower pressure. The backpressure resulting from the absorber recycle stream which is detrimental to the efficient processing of air-volatile liquid vapor mixture from the terminal rack is significantly reduced to the point where any adverse effects are essentially eliminated. Advantageously, the present invention may also be easily retrofitted to conventional vapor recovery systems in the field to make them more efficient and capable of handling greater peak capacity. Accordingly, it is often possible to accommodate terminal rack expansion without the added expense of providing a bladder tank or even a second vapor recovery system.

Depending upon the application, the polisher 60 may be located between the pump 42 and the absorber 62 or the absorber 62 may be located between the pump 42 and the polisher 60. The main factors in determining which embodiment (see FIGS. 1 and 2) should be adopted for a particular application are the amount of air which may be extracted relatively hydrocarbon-free from the beds 18 in the reaction vessels 14, 16 and the vapor pressure of the circulating gasoline. The more air that is passed through the absorber 62, the more hydrocarbons that are picked up from the lean oil and recycled. When an appreciable amount of air may be removed from a bed 18 before significant desorption of hydrocarbons occurs in that bed, it is advantageous to position the polisher 60 before the absorber 62. This configuration effectively removes the efficiency robbing air before it enters the absorber 62. When this configuration is used, there is a minimal recycle load on the beds 18 caused by the hydrocarbon saturated air exiting the absorber 62. Alternatively, in applications where there is minimal free air in the reaction vessels 14, 16 adjacent to beds 18 and/or the circulating gasoline vapor pressure is low year round, the polisher 60 may be located after the absorber 62.

As should further be appreciated, the operating efficiency of the polisher 60 is further enhanced by incorporating the supplemental regeneration valve and conduit system 88. This provides the ability to remove air from the top of the reaction vessels 14, 16 above the absorbent bed 18 without it being drawn through the hydrocarbon-laden adsorbent. As a result, the air-volatile liquid vapor mixture drawn through the polisher 60 includes a lower concentration of volatile liquid vapor. Accordingly, the polisher 60 and polisher bed 64 may be made smaller. This reduces production and recurring maintenance costs and also allows the bed 64 to be more quickly regenerated thereby assuring that polisher bed regeneration is fully completed during each cycle.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, where it is desirable to reduce the concentration level of volatile liquid vapor in the air-volatile liquid vapor mixture initially drawn off the reaction vessel during any regeneration cycle, the supplemental regeneration valve and conduit system 88 may be provided whether or not the polisher 60 is incorporated into the apparatus 10.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A process for recovering volatile liquid vapor from an air-volatile liquid vapor mixture, comprising:

feeding the air-volatile liquid vapor mixture from a source thereof through a first bed of adsorbent having an affinity for the volatile liquid vapor whereby the volatile liquid vapor is adsorbed on said first bed and a substantially volatile liquid vapor-free air stream is exhausted;

desorbing and recovering the volatile liquid vapor from said first bed by pulling a vacuum on said first bed to draw the volatile liquid vapor previously adsorbed by said first bed from said first bed and pumping the air-volatile liquid vapor mixture through an absorber for removing the volatile liquid vapor from the air drawn from the first bed;

initially directing the air-volatile liquid vapor mixture exhausted from the absorber through a polisher including a polisher bed of adsorbent having an affinity for the volatile liquid vapor whereby the volatile liquid vapor is adsorbed and substantially volatile liquid vapor-free air is exhausted; and subsequently directing the air-volatile liquid vapor mixture from the absorber through a second bed of adsorbent having an affinity for the volatile liquid vapor whereby the volatile liquid is adsorbed on said second bed and a substantially volatile liquid vapor-free air stream is exhausted while simultaneously desorbing and recovering the volatile liquid vapor from said first and polisher beds.

2. A process for recovering volatile liquid vapor from an air-volatile liquid vapor mixture, comprising:

feeding the air-volatile liquid vapor mixture from a source thereof through a first bed of adsorbent having an affinity for the volatile liquid vapor whereby the volatile liquid vapor is adsorbed on said first bed and a substantially volatile liquid vapor-free air stream is exhausted;

desorbing and recovering the volatile liquid vapor from said first bed by pulling a vacuum on said first bed to draw the volatile liquid vapor previously adsorbed by said first bed from said first bed and pumping the air-volatile liquid vapor mixture through a polisher including a polisher bed of adsorbent having an affinity for the volatile liquid vapor whereby the volatile liquid vapor is absorbed and substantially volatile liquid vapor free air is exhausted; and subsequently directing the air-volatile liquid vapor mixture from said first bed through an absorber and a second bed of adsorbent having an affinity for the volatile liquid vapor whereby the volatile liquid vapor is adsorbed and substantially volatile liquid vapor free air is exhausted while simultaneously desorbing and recovering volatile liquid vapor from said first and polisher beds.

3. A method of reducing backpressure in a vapor recovery system including a source of air-volatile liquid vapor mixture, at least two reaction vessels in selective fluid communication with the source for holding an adsorbent used to adsorb volatile liquid vapor from the air-volatile liquid vapor mixture delivered from the source and exhaust clean air and a regenerator circuit for regenerating the adsorbent, said method comprising:

providing a polisher in fluid communication with the regenerator circuit for capturing volatile liquid vapor and exhausting clean air; and reducing the amount of air and volatile liquid vapor recycled directly to said at least two reaction vessels during regeneration of said adsorbent by circulating a volume of the air-volatile liquid vapor mixture from one of said at least two reaction vessels to the polisher during regeneration of the adsorbent in said one reaction vessel so that the volatile liquid vapor is captured in the polisher and clean air is exhausted.

4. A method for increasing through-put capacity of an existing vapor recovery system including a source of air-volatile liquid vapor mixture, a vapor recovery circuit for capturing volatile liquid vapor from the air-volatile liquid vapor mixture delivered from the source and a regenerator circuit for regenerating the adsorbent, said method comprising:

providing a polisher for capturing the volatile liquid vapor and exhausting clean air; and connecting the polisher in fluid communication with said regenerator circuit so that the clean air may be exhausted without returning to the vapor recovery circuit thereby reducing backpressure therein.

5. A method of reducing volatile liquid vapor load in a recycled air-volatile liquid vapor mixture during regeneration of adsorbent in a first reaction vessel of a vapor recovery system, said method comprising:

locating an air space in the first reaction vessel adjacent the adsorbent;

providing a regeneration circuit in direct fluid communication with the air space; and drawing a volume of air-volatile liquid vapor mixture from the air space while minimizing drawing of any of the air-volatile liquid vapor mixture from the adsorbent thereby substantially minimizing the volatile liquid vapor load in that volume of the air-volatile liquid vapor mixture drawn during regeneration.

6. An apparatus for recovering volatile liquid vapor from an air-volatile liquid vapor mixture, comprising:

first and second reaction vessels each including a bed of adsorbent having an affinity for the volatile liquid vapor whereby the volatile liquid vapor is adsorbed on said bed and relatively volatile liquid vapor free air is produced;

a pump;

an absorber;

a polisher including a polisher bed of adsorbent having an affinity for the volatile liquid vapor whereby volatile liquid vapor is adsorbed on said polisher bed and relatively volatile liquid vapor free air is produced when initially regenerating one of said beds of adsorbent in said first and second reaction vessels; and a cooperating valve and conduit system for interconnecting said first and second reaction vessels, said pump, said absorber and said polisher.

7. The apparatus set forth in claim 6, wherein said polisher is connected into said cooperating valve and conduit system between said pump and said absorber.

8. The apparatus set forth in claim 6, wherein said polisher is connected into said cooperating valve and conduit system between said absorber and said first and second reaction vessels.

9. The apparatus set forth in claim 6, wherein said first and second reaction vessels each include an air space adjacent said beds and said apparatus further includes a supplemental regeneration valve and conduit system for drawing off air with said pump selectively from said air space in either of said first and second reaction vessels.

10. An apparatus for recovering volatile liquid vapor from an air-volatile liquid vapor mixture, comprising:

first and second reaction vessels each including a bed of adsorbent having an affinity for the volatile liquid vapor whereby the volatile liquid vapor is adsorbed on said bed and relatively volatile liquid vapor free air is produced;

a first cooperating feed valve and conduit system for selectively feeding the air-volatile liquid vapor mixture from a source thereof to either of said first and second reaction vessels;

a pump;

a second cooperating feed valve and conduit system for selectively connecting said pump to either of said first and second reaction vessels for drawing a vacuum on the bed in the connected reaction vessel so as to recover the previously adsorbed volatile liquid vapor now concentrated in air;

an absorber;

an absorber conduit system for feeding the air-volatile liquid vapor mixture from said pump to said absorber;

a polisher including a polisher bed of adsorbent having an affinity for the volatile liquid vapor whereby the volatile liquid vapor is adsorbed on said polisher bed and relatively volatile liquid vapor free air is produced;

a cooperating polisher valve and conduit system for (1) selectively feeding the air-volatile liquid vapor mixture from said absorber to one of said first cooperating feed valve and conduit system and said polisher and (2) selectively connecting said polisher into fluid communication with said pump for regeneration of said polisher bed.

11. The apparatus set forth in claim 10, further including a separator in fluid communication between said pump and said absorber for separating the air-volatile liquid vapor mixture from a sealing fluid for said pump.

12. The apparatus set forth in claim 10, wherein said first and second reaction vessels each include an air space adjacent said beds and said apparatus further includes a supplemental regeneration valve and conduit system for selectively drawing off air with said pump from said air space in either of said first and second reaction vessels.

13. An apparatus for recovering volatile liquid vapor from an air-volatile liquid vapor mixture, comprising:

first and second reaction vessels each including a bed of adsorbent having an affinity for the volatile liquid vapor whereby the volatile liquid vapor is adsorbed on said bed and relatively volatile liquid vapor free air is produced;

a first cooperating feed valve and conduit system for selectively feeding the air-volatile liquid vapor mixture from a source thereof to either of said first and second reaction vessels;

a pump;

a second cooperating feed valve and conduit system for selectively connecting said pump to either of said first and second reaction vessels for drawing a vacuum on the bed in the connected reaction vessel so as to recover the previously adsorbed volatile liquid vapor now concentrated in air;

a polisher including a polisher bed of adsorbent having an affinity for the volatile liquid vapor whereby the volatile liquid vapor is adsorbed on said polisher bed and relatively volatile liquid vapor free air is produced;

an absorber;

a cooperating polisher valve and conduit system for selectively feeding the air-volatile liquid vapor mixture from said pump to one of said polisher and said absorber; and a cooperating absorber conduit system for feeding the air-volatile liquid vapor mixture from said absorber to said first cooperating feed valve and conduit system.

14. The apparatus set forth in claim 13, further including a separator in fluid communication between said pump and said absorber for separating the air-volatile liquid vapor mixture from a sealing fluid for said pump.

15. The apparatus set forth in claim 13, wherein said first and second reaction vessels each include an air space adjacent said beds and said apparatus further includes a supplemental regeneration valve and conduit system for selectively drawing off air with said pump from said air space in either of said first and second reaction vessels.

16. In an apparatus for recovering volatile liquid vapor from an air-volatile liquid vapor mixture wherein said apparatus includes at least one reaction vessel having a bed of adsorbent with an affinity for the volatile liquid vapor as well as a pump and an absorber for regenerating the bed, said improvement comprising an absorber polisher circuit including a polisher having a polisher bed of adsorbent with an affinity for the volatile liquid vapor and a valve and conduit system for (1) selectively feeding the air-volatile liquid vapor mixture from the absorber to one of the polisher and said at least one reaction vessel and (2) selectively connecting said polisher into fluid communication with said pump for regeneration of said polisher bed.

17. In an apparatus for recovering volatile liquid vapor from an air-volatile liquid vapor mixture wherein said apparatus includes at least one reaction vessel having a bed of adsorbent with an affinity for the volatile liquid vapor as well as a pump and an absorber for regenerating the bed, said improvement comprising an absorber polisher circuit including a polisher having a polisher bed of adsorbent with an affinity for the volatile liquid vapor and a valve and conduit system for (1) selectively feeding air-volatile liquid vapor mixture from the pump to one of said polisher and said absorber and (2) selectively connecting said polisher into fluid communication with said pump for regeneration of said polisher bed.

* * * * *